United States Patent [19]

Kawasaki et al.

[11] Patent Number: 4,855,263
[45] Date of Patent: Aug. 8, 1989

[54] SILICON CARBIDE SINTERED BODY AND METHOD OF PRODUCING THE SAME

[75] Inventors: Shinji Kawasaki, Nagoya; Tomonori Takahashi, Chita, both of Japan

[73] Assignee: NGK Insulators, Ltd., Japan

[21] Appl. No.: 212,317

[22] Filed: Jun. 27, 1988

[30] Foreign Application Priority Data

Jul. 6, 1987 [JP] Japan .................. 62-167062

[51] Int. Cl.⁴ .................. C04B 35/56; C04B 35/58
[52] U.S. Cl. .................. 501/92; 501/88; 501/90; 501/96
[58] Field of Search .................. 501/88, 90, 92, 96

[56] References Cited

U.S. PATENT DOCUMENTS

| | | | |
|---|---|---|---|
| 4,041,117 | 8/1977 | Prochazka | 264/63 |
| 4,124,667 | 11/1978 | Coppola et al. | 501/92 X |
| 4,209,474 | 6/1980 | Prochazka | 501/92 X |
| 4,524,138 | 6/1985 | Schwetz et al. | 501/91 X |
| 4,537,735 | 8/1985 | Enomoto et al. | 501/90 X |

FOREIGN PATENT DOCUMENTS

| | | |
|---|---|---|
| 0209884 | 12/1982 | Japan .................. 501/92 |
| 60-131863 | 7/1985 | Japan . |
| 60-200861 | 10/1985 | Japan . |
| 61-3303 | 1/1986 | Japan . |
| 61-242959 | 10/1986 | Japan . |
| 61-256976 | 11/1986 | Japan . |

Primary Examiner—William R. Dixon, Jr.
Assistant Examiner—Karl Group
Attorney, Agent, or Firm—Arnold, White & Durkee

[57] ABSTRACT

A silicon carbide sintered body containing given amounts of Mg, B and free carbon and having a density of not less than 2.80 g/cm³ is produced by adding given amounts of magnesium boride and carbon to silicon carbide powder having an average grain size of not more than 5 μm, shaping and firing at 1,900°~2,300° C. under vacuum or in an inert gas atmosphere.

6 Claims, 5 Drawing Sheets

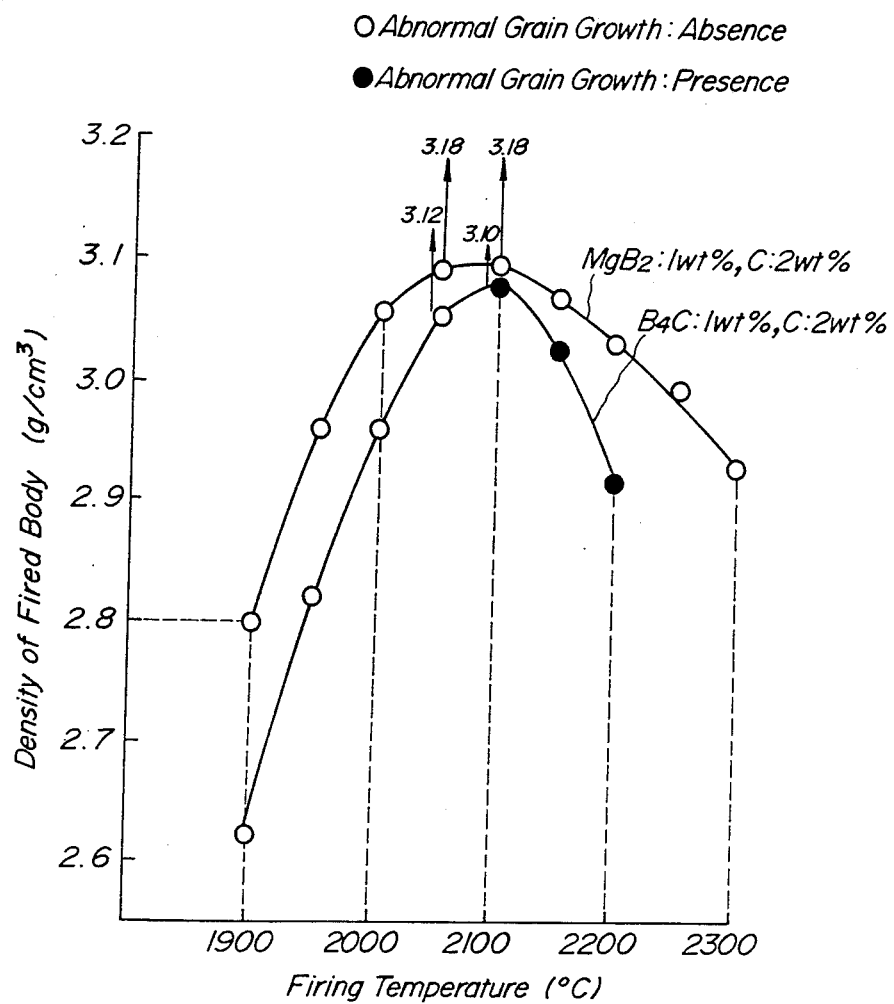
FIG_1

MgB$_2$-C Series Silicon Carbide Sintered Body

100μm

B-C Series Silicon Carbide Sintered Body

100μm

FIG_3
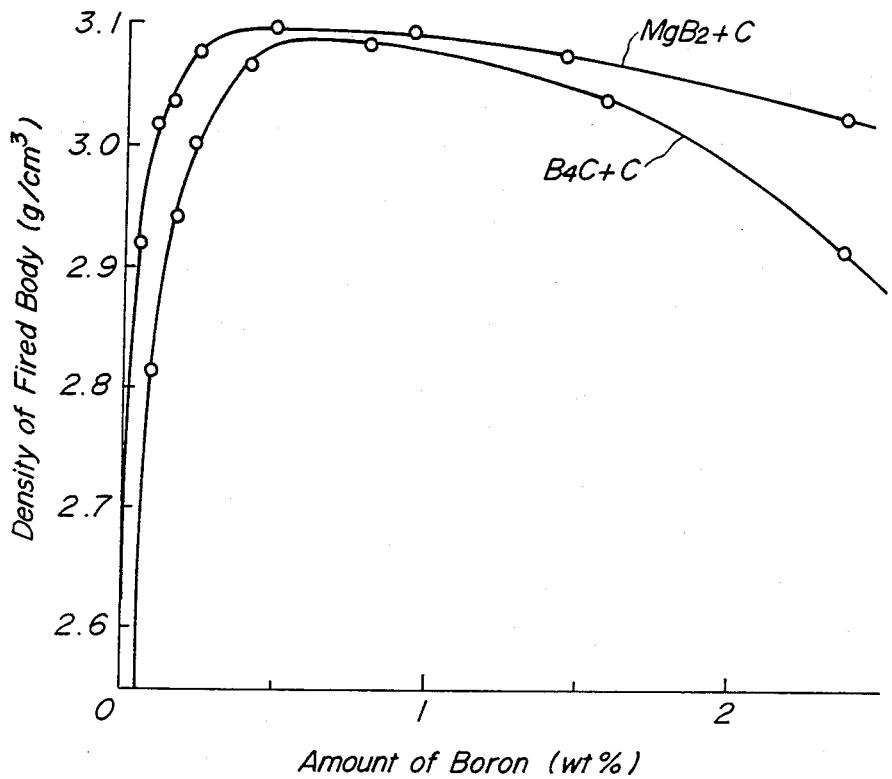

FIG_5
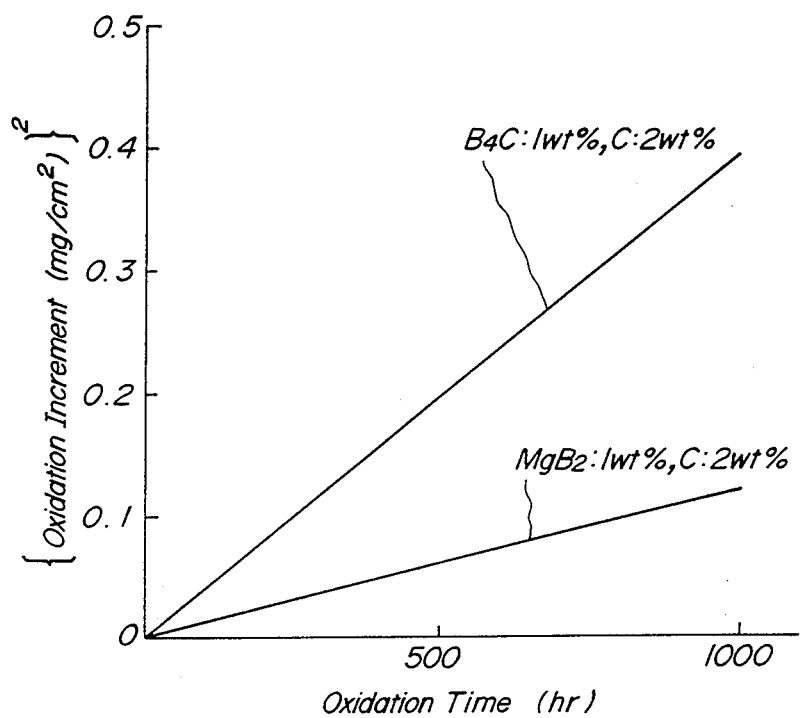

SILICON CARBIDE SINTERED BODY AND METHOD OF PRODUCING THE SAME

BACKGROUND OF THE INVENTION Field of the Invention

This invention relates to a silicon carbide sintered body and a method of producing the same.

2. Related Art Statement

The silicon carbide sintered bodies have excellent chemical and physical properties, so that they are noticed as a material suitable for high temperature structures particularly used under severe conditions, such as gas turbine parts, high temperature exchanger and the like. On the other hand, the technique of producing such a silicon carbide sintered body is shifting from the conventional reaction sintering process or pressure sintering process to a pressureless sintering process wherein a mixed powder of silicon carbide, boron-containing additives and carbonaceous additives is sintered in an inert gas atmosphere under no pressure.

In the production of a so-called B-C series silicon carbide sintered body through the above pressureless sintering process, when $\beta$-SiC is used as a starting material, since boron or boron-containing additive (generally $B_4C$), effectively used for the densification purposes added, silicon carbide grains abnormally grow to about several hundred microns at a state including bubbles in the transition from $\beta$ to $\alpha$ (abnormal grain growth) at a last sintering stage, which is different from a usual grain growth accompanying densification, so that not only the densification is suppressed but also the degradation of properties is observed. In order to solve this problem, it is necessary that the additional amount of boron is reduced, and the firing is carried out at a low temperature causing no transition from $\beta$ to $\alpha$, and the firing temperature is controlled with high accuracy.

There have heretofore been proposed various methods for reducing the additional amount of boron, for example, a method of using a specific SiC starting material which can not necessarily be obtained easily and cheaply, such as super-high purity SiC starting material containing not more than 15 ppm of metal impurity (Japanese Patent laid open No. 60-131,863); a method of conducting a pretreatment wherein a shaped body of a starting mixture is heated under a predetermined pressure and temperature and at the same time the resulting CO gas is exhausted and removed (Japanese Patent Application Publication No. 61-3,303); a method of using a pitch requiring complicated handling as a carbon source (Japanese Patent laid open Nos.60-200,861, 61-242,959 and 61-256,976) and the like. Even in these methods, however, it is required to conduct the firing at a relatively low temperature causing no transition from $\beta$ to $\alpha$ for suppressing the abnormal grain growth at the last sintering stage, so that it is difficult to achieve sufficient densification at such a low firing temperature.

SUMMARY OF THE INVENTION

It is, therefore, an object of the invention to provide a technique for the production of silicon carbide sintered bodies which can perform the densification at a relatively low temperature without causing the conflicting drawbacks of the conventional techniques, as mentioned above, before the obstruction of the densification through grain growth and can easily produce silicon carbide sintered bodies having a desirable grain shape without causing the abnormal grain growth through high temperature firing. It is another object of the invention to provide a silicon carbide sintered body having high mechanical strengths and improved heat resistance and oxidation resistance.

The silicon carbide sintered body according to the invention is characterized by containing 0.01~2% by weight of magnesium, 0.02~2% by weight of boron and 0.1~2% by weight of free carbon and having a density of not less than 2.80 g/cm$^3$.

Furthermore, the invention provides a method of producing a silicon carbide sintered body, which comprises adding and mixing powders of silicon carbide having an average grain size of not more than 5 $\mu$m with 0.1~5% by weight of magnesium boride and 0.1~5% by weight of carbon or an organic compound producing the same quantity of carbon, shaping the resulting mixture into a predetermined form, and firing the resulting shaped body at a temperature of 1,900°~2,300° C. under vacuum or in an inert gas atmosphere.

In the practice of the invention, the magnesium boride may be obtained by separately adding a magnesium containing additive (Mg, $Mg_2C_3$, MgO or the like) and a boron containing additive (B, $B_4C$, $B_{2H}O_3$ or the like) and synthesizing in a shaped body or a mixed powder at an initial firing stage or through a separate heat treatment before the firing besides the addition of magnesium boride itself. Alternatively, magnesium, boron and carbon may be added in the synthesis of SiC powder.

BRIEF DESCRIPTION OF THE DRAWINGS

The invention will be described with reference to the accompanying drawings, wherein:

FIG. 1 is a graph showing a relationship between the firing temperature and the density after the firing in the silicon carbide sintered body according to the invention as well as an increasing rate of the density through HIP treatment;

FIG. 3 is a graph showing a relationship between the amount of boron added and the density after the firing in the silicon carbide sintered body according to the invention;

FIG. 5 is a graph showing the oxidation property of the silicon carbide sintered body according to the invention.

DESCRIPTION OF THE PREFERRED EMBODIMENTS

Figure 2A:
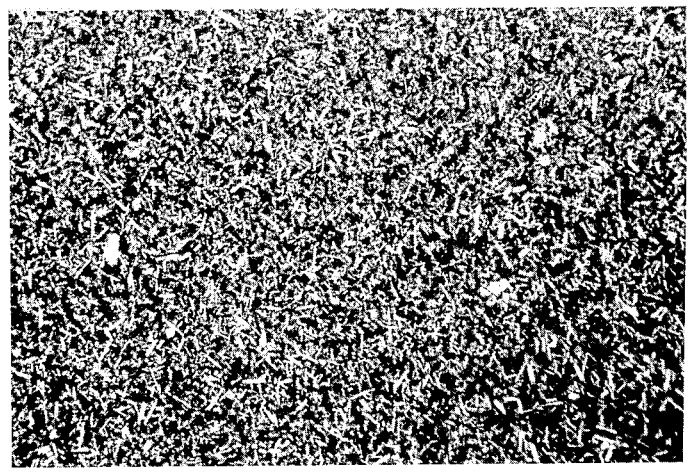
FIGS. 2A and 2B are optical photomicrographs showing a grain structure of the silicon carbide sintered body according to the invention.

According to the invention, silicon carbide powder having an average grain size of not more than 5 $\mu$m is used as a starting material for a silicon carbide sintered body. The reason on the limitation of average grain size to not more than 5 $\mu$m is due to the fact that when it exceeds 5 $\mu$m, the dense sintered body can not be obtained. Moreover, it is desirable that the silicon carbide powder consists of 100~50% by weight of $\beta$-SiC powder and the remainder being substantially $\alpha$-SiC or amorphous SiC powder because, when the amount of $\beta$-SiC powder is less than 50% by weight, the growth of plate-like grains inherent to the case of using $\beta$-SiC powder is not sufficiently promoted and excellent mechanical properties are not obtained.

The essential feature of the invention lies in the use of magnesium boride (e.g. $MgB_2$, $MgB_4$, $MgB_6$, $MgB_{12}$ or the like). The reason why the amount of magnesium boride is limited to a range of 0.1~5% by weight to silicon carbide powder is due to the fact that when the amount of magnesium boride is less than 0.1% by weight, sufficient densification is not attained and the additional effect is not recognized, while when it exceeds 5% by weight, the silicon carbide grains grow at the initial firing stage to cause no sufficient densification. Preferably, the amount of magnesium boride is within a range of 0.5~1.0% by weight.

According to the invention, carbon or an organic compound producing the same amount of carbon is further added to the silicon carbide powder in an amount of 0.1~5% by weight. The reason why the amount of carbon is limited to the above range is due to the fact that when the amount of carbon is less than 0.1% by weight, $SiO_2$ film is not sufficiently removed from the surface of the fired body, while when it exceeds 5% by weight, more than 2% by weight of free carbon remains in the fired body to degrade the properties.

In the method of the invention, the silicon carbide powder added with predetermined amounts of magnesium boride and carbon or organic compound is fired at a temperature of 1,900~2,300° C. under vacuum or in an inert gas atmosphere after the shaping. The reason why the firing temperature is limited to the above range is due to the fact that when the firing temperature is lower than 1,900° C., sufficient densification is not achieved, while when it is higher than 2,300° C., the decomposition of silicon carbide becomes vigorous to make the surface of the resulting fired body rough and consequently the sufficiently smooth surface can not be obtained.

The silicon carbide sintered body according to the invention is necessary to have a density of not less than 2.80 g/cm³. When the density is less than 2.80 g/cm³, it is difficult to realize excellent chemical and mechanical properties inherent to the silicon carbide sintered body according to the invention.

According to the invention, by using the magnesium boride as an additive, the fired body is sufficiently densified at a relatively low firing temperature without causing the abnormal grain growth at a relatively high firing temperature though the amount of boron added is small, so that it is possible to easily produce the silicon carbide sintered body having a desirable grain form. Such an effect is considered to result from magnesium in the magnesium boride. Although it is not yet detailedly elucidated how to contribute magnesium to the densification and the effect of suppressing the abnormal grain growth at high temperatures, it is believed that magnesium is soluted into silicon carbide at a low temperature region of the firing stage to promote the densification and converts from $\beta$ to $\alpha$ without causing the abnormal grain growth at a relatively low temperature.

According to the invention, the firing can be carried out within a relatively wide temperature range, so that it is needless to precisely control the firing temperature as in the conventional technique. Furthermore, the amount of boron added is reduced, so that the abnormal grain growth is effectively suppressed without taking a special procedure as in the conventional technique, and it is possible to provide silicon carbide sintered bodies having high strength.

The silicon carbide sintered body obtained by the method of the invention has an improved oxidation resistance as compared with the conventional B-C series silicon carbide sintered body. This is due to the fact that the silicon carbide sintered body according to the invention is dense and the grain size of silicon carbide grain is small and uniform so that the oxidation reaction is uniformly promoted and further the oxide film produced on the surface through oxidation is densified by the magnesium component contained in the sintered body.

Moreover, the silicon carbide sintered body according to the invention has a small grain size of silicon carbide powder as compared with the conventional B-C series silicon carbide sintered body and has no open pores, so that the silicon carbide sintered body having a further increased densification degree can be obtained by subjecting to a capsule-free HIP treatment after the sintering.

The invention will be described with reference to the following example leading in the success of the invention.

The comparison experiments were made under various conditions by using silicon carbide powder added with $MgB_2$ and C or silicon carbide powder added with $B_4C$ and C as a starting mixture to obtain experimental results as shown in FIGS. 1 to 5.

Moreover, the starting silicon carbide powder used consisted of 93% by weight of $\beta$-SiC and the remainder being $\alpha$-SiC and inevitable impurities and had an average grain size of 0.42 μm and a specific surface area of 20.0 m²/g and a chemical composition (% by weight) as shown in the following Table 1. The quantification of $\beta$-SiC was made according to a method described in Journal of Japanese Ceramics Associate 87, pp577~578 (1979).

TABLE 1

| Total-Si | 69.13 |
| Free-SiO₂ | 0.47 |
| Free-Si | 0.010 |
| Free-C | 0.51 |
| O | 0.90 |
| Al | 0.056 |
| Fe | 0.060 |
| Ca | 0.016 |
| Mg | 0.001 |
| K | <0.001 |
| Na | 0.001 |
| Cu | — |
| Ti | 0.007 |
| N | 0.27 |

First, a mixture of the starting silicon carbide powder shown in Table 1 containing 1% by weight of $MgB_2$ and 2% by weight of C (carbon black) or a mixture containing 1% by weight of $B_4C$ and 2% by weight of C was prepared and then added to isopropyl alcohol, which was pulverized and mixed in a wet-type ball mill. This mixture was preliminarily shaped and then pressed into a square plate of 60×60×6 mm under a hydrostatic pressure of 3 ton/cm². Next, the shaped body was fired up to 1,500° C. under vacuum and further at a constant temperature in an argon gas atmosphere under an atmospheric pressure for 1 hour.

In FIG. 1 is plotted the density of the fired body when varying the firing temperature in the firing under the argon gas atmosphere of atmospheric pressure, wherein mark● shows the fired body causing no abnormal grain growth and mark○ shows the fired body causing the abnormal grain growth. When the silicon carbide sintered body according to the invention is compared with the B-C series silicon carbide sintered body of the comparative example, it is apparent that sufficient densification is achieved even at a low firing temperature in the invention. Furthermore, it is clear that the silicon carbide sintered body having a required density and no abnormal grain growth is obtained over a wide firing temperature range according to the invention. In other words, precise control of the firing temperature is not required in the invention. Moreover, an arrow shown in FIG. 1 indicates an amount of density increased when the sintered body is subjected to an HIP (hot isostatic pressing) treatment at 1,900° C. in an argon gas atmosphere under a pressure of 2,000 atmospheric pressure, form which it is apparent that the more densification of the sintered body according to the invention can easily be achieved by the HIP treatment as compared with the B-C series silicon carbide sintered body.

Figure 2B:
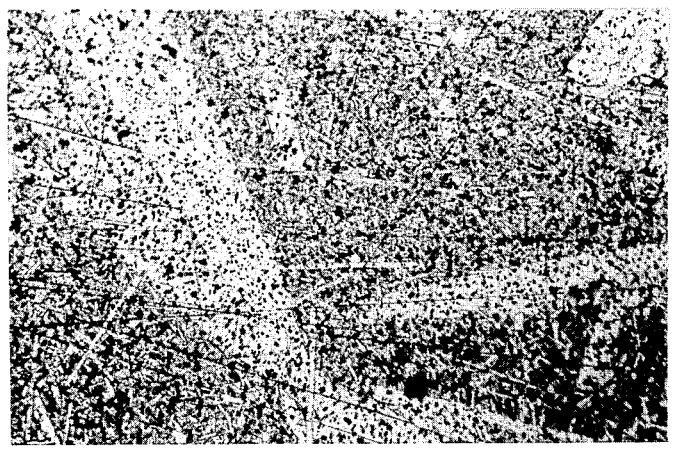

Each of $MgB_2$-C series silicon carbide sintered body and B-C series silicon carbide sintered body produced at the firing temperature of 2,100° C. as shown in FIG. 1 was subjected to polishing and etching, and thereafter the grain structure on the etched surface was observed by an optical microscope. FIGS. 2A and 2B shows microphotographs of the surfaces of these sintered bodies. As seen from FIG. 2A, the $MgB_2$-C series silicon carbide sintered body according to the invention shows no abnormal grain growth and consists of plate-like silicon carbide grains having a uniform grain size. On the other hand, in the B-C series silicon carbide sintered body shown in FIG. 2B, the silicon carbide grains enter bubbles to abnormally grow up to about several hundred microns. Moreover, the amount of α-SiC in the fired body was about 60% in both the silicon carbide sintered bodies.

Then, the starting silicon carbide powder as mentioned above was added with 2% by weight of carbon and variable amounts of boron, which was subjected to the same procedure as mentioned above and fired at a temperature of 2,100° C. in an argon gas atmosphere under an atmospheric pressure for 1 hour. The density of the resulting fired body is plotted in FIG. 3 as a function of boron amount. As seen from FIG. 3, according to the invention, the required densification can be achieved without taking the special procedure as in the conventional technique though the amount of boron added is small.

Figure 4:
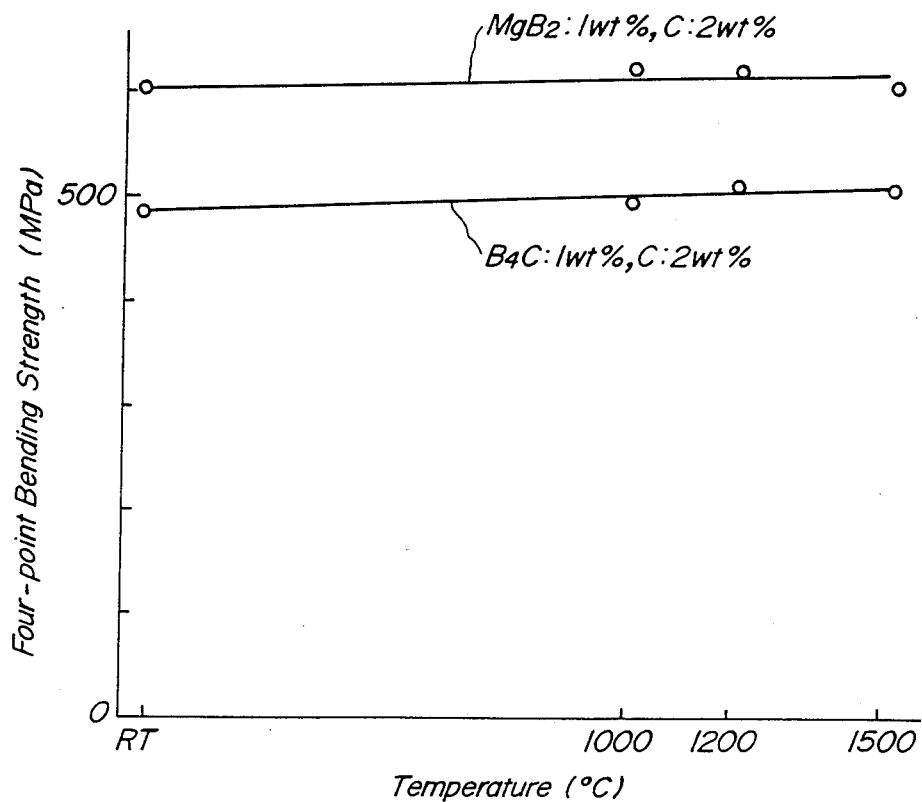
FIG. 4 is a graph showing a temperature dependence of the bending strength in the silicon carbide sintered body according to the invention.

FIG. 4 shows results of four-point bending strength measured according to JIS R1601 (test method of bending strength in fine ceramics) on the silicon carbide sintered bodies obtained by firing the shaped body prepared in the same manner as in FIG. 1 at 2,100° C. in an argon gas atmosphere under atmospheric pressure. As seen from FIG. 4, according to the invention, the higher strength can be achieved as compared with the B-C series silicon carbide sintered body of the comparative example.

In FIG. 5 is plotted a change of oxidation increment with a lapse of time when the silicon carbide sintered body obtained in the same manner as in FIG. 4 is left to stand in air at a temperature of 1,500° C., which indicates the oxidation property of the sintered body. As seen from FIG. 5, the silicon carbide sintered body according to the invention is superior in the oxidation resistance to the B-C series silicon carbide sintered body of the comparative example.

Finally, Table 2 shows analytical values of magnesium, boron and free carbon measured on the specimens of magnesium boride-C series sintered body and B-C series sintered body after the firing at 2,100° C. for 1 hour as well as the measured value of density of fired body and the observation result of abnormal grain growth.

TABLE 2

| | Composition added (weight %) | | Analytical value of fired body (weight %) | | | Density of fired body ($g/cm^3$) | Abnormal grain growth |
|---|---|---|---|---|---|---|---|
| | | | magnesium | boron | free carbon | | |
| Comparative Example 1 | $MgB_2$: | 0.05  C: 2 | <0.01 | 0.02 | — | 2.71 | absence |
| Example 1 | " | 0.1   " | 0.01 | 0.03 | 1.9 | 2.92 | " |
| Example 2 | " | 0.5   " | 0.08 | 0.18 | 1.2 | 3.08 | " |
| Example 3 | " | 1.0   " | 0.16 | 0.38 | 1.1 | 3.10 | " |
| Example 4 | " | 5.0   " | 0.71 | 1.86 | 0.8 | 3.03 | " |
| Comparative Example 2 | " | 10.0  " | 1.03 | 2.60 | — | 2.69 | " |
| Example 3 | " | 1.0   C: 0 | — | — | <0.1 | 2.11 | " |
| Example 5 | " | "     C: 1 | — | — | 0.5 | 2.99 | " |
| Example 6 | " | "     C: 5 | — | — | 1.8 | 2.93 | " |
| Comparative Example 4 | " | "     C: 10 | — | — | 4.2 | 2.72 | " |
| Example 7 | $MgB_{12}$ | "     C: 2 | 0.05 | 0.60 | — | 3.05 | " |
| Example 8 | $MgB_6$ | "     C: 2 | 0.08 | 0.52 | — | 3.09 | " |
| Comparative Example 5 | $B_4C$ | "     C: 2 | <0.01 | 0.55 | 0.9 | 3.08 | presence |

As seen from Table 2, the density of the fired body is low when the amount of magnesium boride added is less than 0.15% by weight (Comparative Example 1), while the density lowers when the amount is more than 5% by weight (Comparative Example 2). On the other hand, the density of the fired body is low when carbon is not added (Comparative Example 3), while when the amount of carbon added exceeds 5% by weight, not only the density of the fired body lowers but also the amount of free carbon degrading the properties of the sintered body becomes larger (Comparative Example 4). Furthermore, in the B-C series silicon carbide sintered body (Comparative Example 5), the high density sintered body having a density of 3.08 $g/cm^3$ is obtained, but the abnormal grain growth is observed.

On the contrary, when the amount of magnesium boride added is within a range of 0.1~5% by weight and the amount of carbon added is within a range of 0.1~5% by weight, silicon carbide sintered bodies containing 0.01~2% by weight of magnesium, 0.02~2% by weight of boron and 0.1~2% by weight of free carbon and having a density of not less than 2.80 g/cm$^3$ are obtained as seen from Examples 1 to 8.

As mentioned above, according to the invention, the silicon carbide powder can be fired over a wide firing temperature range without causing the various problems as in the conventional techniques to produce dense silicon carbide sintered bodies having desired grain form without causing abnormal grain growth, and high strength and oxidation resistance.

What is claimed is:

1. A silicon carbide sintered body comprising 0.01~2% by weight of magnesium, 0.02~2% by weight of boron 0.1~2% by weight of free carbon and the remainder being silicon carbide, and having a density of not less than 2.80 g/cm$^3$.

2. A method of producing a silicon carbide sintered body, which comprises adding and mixing powder of silicon carbide having an average grain size of not more than 5 μm with 0.1~5% by weight of magnesium boride and 0.1~5% by weight of carbon or an organic compound producing the same quantity of carbon, shaping the resulting mixture into a form, and firing the resulting shaped body at a temperature of 1,900°~2,300° C. under vacuum or in an inert gas atmosphere.

3. The method according to claim 2, wherein said silicon carbide powder consists of 100~50% by weight of β-SiC and the remainder being substantially α-SiC or amorphous SiC powder.

4. The method according to claim 2, wherein said magnesium boride is selected from the group consisting of $MgB_2$, $MgB_4$, $MgB_6$ and $MgB_{12}$.

5. The method according to claim 2, wherein said magnesium boride is added by separately adding a magnesium-containing additive and a boron-containing additive and synthesizing in the mixed powder or shaped body through heat treatment before said firing.

6. The method according to claim 5, wherein said magnesium-containing additive is selected from the group consisting of Mg, $Mg_2C_3$ and MgO and said boron-containing additive is selected from B, $B_4C$ and $B_2O_3$.

* * * * *